United States Patent Office
3,509,170
Patented Apr. 28, 1970

3,509,170
HETEROCYCLIC AMINO-OXAZOLINES
George Levitt, Wilmington, Del., assignor to E. I. du Pont de Nemours and Company, Wilmington, Del., a corporation of Delaware
No Drawing. Filed June 12, 1967, Ser. No. 646,154
Int. Cl. C07d 85/36
U.S. Cl. 260—307
9 Claims

ABSTRACT OF THE DISCLOSURE

Amino-oxazolines useful as central nervous system depressants having the formula:

(I)

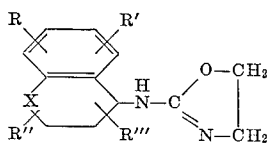

(II)

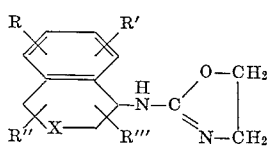

wherein

X is oxygen, sulfur or methylamino;
R is hydrogen or alkyl;
R′ is hydrogen, alkyl, alkoxy, alkylthio, dimethylamino, fluorine, chlorine or bromine;
R″ is hydrogen or alkyl;
R‴ is hydrogen or alkyl.

Typical is 2-(4-thiochromanylamino)-2-oxazoline useful as a central nervous system depressant.

BACKGROUND OF THE INVENTION

The following applications relate to various classes of oxazolines generally useful as pharmaceuticals:

Harvey, Ser. No. 521,746, filed Jan. 19, 1966, now Patent No. 3,453,284; Levitt, Ser. No. 479,054, filed Aug. 10, 1965; Levitt, Ser. No. 479,055, filed Aug. 10, 1965; Harvey, Ser. No. 468,999, filed July 1, 1965; Harvey, Ser. No. 348,290, filed Feb. 28, 1964; Harvey, Ser. No. 313,-756, filed Sept. 30, 1963, granted as United States Patent No. 3,432,600.

The present invention is directed to a new class of oxazolines having central nervous system depressant effect.

SUMMARY OF THE INVENTION

This invention relates to amino-oxazolines.

More specifically this invention refers to compounds of the formula:

(1)

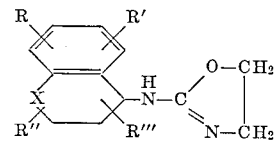

(2)

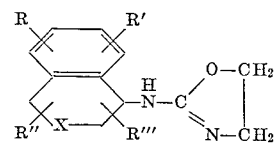

wherein:

X is oxygen, sulfur or methylamino;
R is hydrogen or alkyl of 1 through 4 carbon atoms;
R′ is hydrogen, alkyl of 1 through 4 carbon atoms, alkoxy of 1 through 4 carbon atoms, alkylthio of 1 through 4 carbon atoms, dimethylamino, fluorine, chlorine, or bromine;
R″ is hydrogen or alkyl of 1 through 4 carbon atoms;
R‴ is hydrogen or alkyl of 1 through 4 carbon atoms.

Preferred because of excellent central nervous system depressant activity at low use rates are those compounds of Formulas 1 and 2 wherein X is oxygen or sulfur; R, R″ and R‴ are hydrogen and R′ is alkyl, alkoxy or hydrogen.

UTILITY

The compounds of Formulas 1 and 2 above exhibit pharmaceutical properties including central nervous system depressant activity.

Preferred compounds because of high therapeutic ratios at low rates of use are:

2-(4-thiochromanylamino)-2-oxazoline,
2-(4-isothiochromanylamino)-2-oxazoline,
2-(4-chromanylamino)-2-oxazoline,
2-(4-isochromanylamino)-2-oxazoline,
2-(1,2,3,4-tetrahydro-1-methyl-4-quinolinylamino)-2-oxazoline,
2-(8-methyl-4-thiochromanylamino)-2-oxazoline,
2-(8-methyl-4-chromanylamino)-2-oxazoline and
2-(8-methoxy-4-chromanylamino)-2-oxazoline.

PREPARATION

The compounds of Formulas 1 and 2 above are synthesized by reacting an appropriately substituted aminochroman, aminoisochroman, aminothiochroman, aminoisothiochroman, amino-1,2,3,4-tetrahydroquinoline or amino-1,2,3,4-tetrahydroisoquinoline with β-chloroethylisocyanate in an inert solvent such as benzene or dioxane to yield a β-chloroethylurea (Equation A) and converting the urea to the hydrochloride salt of the desired oxazoline by refluxing in water (Equation B). Dropwise addition of ammonia hydroxide to this solution to pH 9 yields the desired oxazoline as a free base (Equation C). Using 4-aminothiochroman as the starting material the reaction is structurally exemplified as follows:

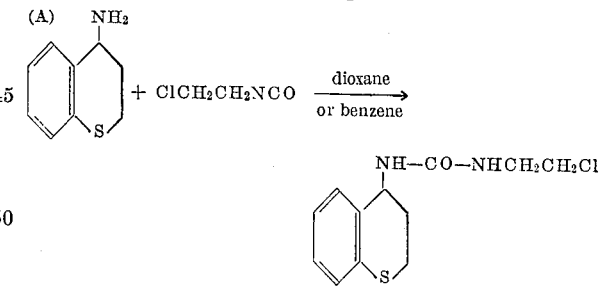

The urea product of Equation A is usually obtained as an insoluble solid which can be isolated by filtration, or if a water miscible solvent such as dioxane is used in Equation A, water can be added directly to the mixture so that the reaction in Equation B is carried out without isolation of the urea. In Equation B the oxazoline salts are water soluble whereas the by-products are usually insoluble and are removed by filtration.

Precipitation of the product as a solid in Equation C is aided by scratching the inside of the container while adding the ammonium hydroxide very slowly.

The oxazoline product is removed by filtration and purified by recrystallization from an organic solvent system such as acetonitrile, isopropyl alcohol or benzene-cyclohexane mixture. If the product is an oil or is water soluble, it is separated from the water by extraction with a solvent such as methylene chloride. Then the organic solution is dried over magnesium sulfate, filtered and stripped. The residue thus obtained is the desired free base form of the oxazoline which usually solidifies upon triturating with a small amount of ethyl ether. If the free base does not form a solid readily, the solid hydrochloride salt is obtained by grasping an ether solution of the free base.

It is intended to include within the purview of the invention, the acid addition salts which these compounds form with acids having pharmaceutically acceptable anions. The term "pharmaceutically acceptable anion" has a definite meaning to one skilled in the art. It is defined as a non-toxic anion of any of the simple acids commercially used to neutralize basic medicinal agents. These acids include, for example, hydrochloric, hydrobromic, hydroiodic, sulfuric, succinic, maleic, tartaric, citric, glycolic and others. The pharmaceutical activity of the molecule is primarily a function of the cation, the anion serving chiefly to supply electric neutrality and water solubility.

It should be noted that the dry salts such as the hydrochloride decompose whereas these same salts are stable in water.

By reference to the reaction described above, it can be seen that in the ordinary practice of the pharmaceutical process of the invention, the oxazoline salts produced will be hydrobromides, hydrochlorides, hydroiodides, methanesulfonic acid or p-toluenesulfonic acid salts. These salts can be converted to other pharmaceutically acceptable salts by procedures well known to those skilled in the art. One highly useful method comprises contacting the acid addition salt with a basic anion exchange resin and subsequently adding the prescribed amount of the appropriate acid to the eluant solution containing the free base. For example, a highly basic compound can be used in this reaction such as the one available in the trade under the name "Amberlite IRA–400." This resin is a polyquaternary ammonium compound which is prepared by chloromethylating a higher cross-linking copolymer of styrene and divinylbenzene followed by treatment of the chloromethylated material with a tertiary amine such as trimethylamine.

PHARMACEUTICAL COMPOSITIONS

The compounds of this invention hereinafter termed the active ingredients can be administered alone but are generally administered with a pharmaceutically acceptable inert carrier selected on the basis of the chosen route of administration and standard pharmaceutical practice. For example, they can be administered orally in dry form, if stabilized, such as in tablets or capsules containing such excipients as starch, milk sugar, certain types of clay, etc. They also can be administered orally in the form of elixirs or oral suspensions which can contain coloring and flavoring agents. They can be injected parenterally and for this use can be prepared in the form of sterile aqueous solutions containing other solutes such as saline or glucose in sufficient quantity to make the solution isotonic. For intramuscular administration compositions of the compounds of this invention can be prepared in an oil base such as peanut or sesame oil.

The compositions of this invention can take a variety of forms. Various diluents can be employed and the percentage of active ingredients can be varied. It is necessary that an active ingredient form a proportion of the composition such that a pharmaceutically effective dosage form will be obtained. Obviously several dosage unit forms can be administered at about the same time. Although compositions with less than 0.005% by weight of active ingredient are suitable, it is preferred to use compositions containing not less than 0.005% of the active ingredient. Otherwise the amount of carrier becomes excessively large. Activity increase with the concentration of the active ingredient. The percentage by weight of the active ingredient can be 10, 50, 75, 95% or even higher. Dosage unit forms can be prepared with a major amount of a pharmaceutically acceptable diluent and a minor proportion of active ingredient and vice-versa.

Water soluble mixtures containing the compounds of the present invention are prepared with solid acids such as citric, tartaric, p-toluenesulfonic, maleic, pamoic and succinic acids by uniformly mixing equivalent or molar amounts of the active compounds of this invention with the desired acid. These mixtures are stable over extended periods of time. Aqueous solutions of the desired concentrations can be prepared from weighed portions of these mixtures.

Dosages

The compounds of the invention will be administered in a dosage generally of the same or lower order of magnitude as with other pharmaceutical compounds having similar activity. In some instances the optimum dosages for compounds of this invention will be lower than the optimum dosage of other compounds generally recommended for the same use.

The expert administering the active ingredient will deterimne the exact dosage which will be a pharmaceutically effective amount for a particular application, and as might be expected, it will vary depending upon the age, weight and general health of the warm-blooded animal under treatment. Oral dosages will require a larger quantity of the active compound than a parenteral dose to produce the same effect in the warm-blooded animal.

Oral dosages constituting a pharmaceutically effective amount will comprise the active compound in the amount of from 0.1 mg. to 10.0 mg. per kilogram of body weight.

Parenteral dosages constituting a pharmaceutically effective amount will comprise the active compound in the amount of from 0.1 mg. to 250 mg. per kilogram of body weight.

Vapor or spray application through the mouth and nasal passages constituting a pharmaceutically effective amount will comprise a dosage containing 100 to 25,000 Ct for an exposure of one minute of active compound.

The following additional examples are given to further exemplify the invention.

EXAMPLE 1

2-(4-thiochromanylamino)-2-oxazoline

Part (A) β-chloromethylurea synthesis.—4-Aminothiochromane hydrochloride, 6.4 grams (0.32 mole) is added to 15 milliliters of 20% aqueous sodium hydroxide, stirred for fifteen minutes and the resultant mixture is extracted twice with 25 milliliter portions of ethyl ether. The combined ether extracts are dried over magnesium sulfate and filtered. To the filtrate thus obtained is added 3.5 grams (.003 mole) of 2-chloroethylisocyanate in 25 milliters of benzene, dropwise, causing an exothermic reaction and the formation of a white precipitate. This precipitate is removed by filtration to yield 6.4 grams (75%) of 1-(2-chloroethyl)-3 - (4 - thiochromanyl)urea, M.P. 124–217° C.

*Analysis.*—Calcd. for $C_{12}H_{15}ClN_2OS$ (percent): C, 53.3; H, 5.58; N, 10.35. Found (percent): C, 53.58; H, 5.72; N, 10.07.

Part (B) Ring closure to the oxazoline.—Four hundred milliliters of water are heated to boiling and 4.5 grams of the urea from the preceding experiment are added portionwise. Twenty-five milliliters of ethyl alcohol are added and the mixture refluxed for 40 minutes during which time all of the solid present goes into solution. The solution is then cooled, filtered and made alkaline by the slow addition of concentrated ammonium hydroxide. Extraction of this basic solution with three 50-milliliter portions of methylene chloride, followed respectively by drying the combined organic phase over magnesium sulfate, filtration and evaporation of solvent, yields 2-(4-thiochromanylamino)-2-oxazoline as an oil. Trituration of this oil with cold ether converts it to a solid; yielding 3.19 grams (80%), melting at 114–116° C.

Analysis.—Calcd. for $C_{12}H_{14}N_2OS$ (percent): C, 61.5; H, 6.05; N, 11.93. Found (percent): C, 62.05; H, 6.33; N, 11.50.

Isolation of the urea intermediate in the above synthesis can be avoided by evaporating the ether solution in part A containing the free amine, redissolving the amine in dry dioxane and adding a weighed equivalent of chloroethyl isocyanate to this solution. The ring closure (Part B) is carried out by adding the prescribed amount of water to the dioxane-urea mixture and proceeding as above.

A parenteral composition suitable for administration by injection is prepared by dissolving 5% by weight of 2-(4-thiochromanylamino)-2-oxazoline in 95% by volume of physiological saline and sterilizing the resultant solution by filtration. A buffer can be used if desired.

Mice are injected via the tail vein with the above formulation at a dosage of 0.1 milligram of active ingredient per kilogram of body weight. Marked central nervous system depression results as exemplified by depression of spontaneous motor activity and hypothermia for several hours. Toxicity occurs at such dosages that a therapeutic ratio of 50 or more is obtained.

EXAMPLES 2–50

The following products are synthesized by combining the indicated intermediate amines with 2-chloroethylisocyanate in the manner described in Example 1, Parts A and B. The product is formulated and injected in the manner of the 2-(4-thiochromanylamino)-2-oxazoline of Example 1 to provide like results.

| Ex. No. | Intermediate amine | Product |
| --- | --- | --- |
| 2 | 4-aminoisothiochroman | 2-(4-isothiochromanylamino-2-oxazoline. |
| 3 | 4-aminochroman | 2-(4-chromanylamino)-2-oxazoline. |
| 4 | aminoisochroman | 2-(4-isochromanylamino)-2-oxazoline |
| 5 | 4-amino-1,2,3,4-tetrahydro-1-methylquinoline. | 2-(1,2,3,4-tetrahydro-1-methyl-4-quinolinylamino)-2-oxazoline. |
| 6 | 4-amino-8-methylthiochroman. | 2-(8-methyl-4-thiochromanylamino)-2-oxazoline. |
| 7 | 4-amino-8-methylchroman. | 2-(8-methyl-4-chromanylamino)-2-oxazoline. |
| 8 | 4-amino-8-methoxychroman. | 2-(8-methoxy-4-chromanylamino)-2-oxazoline. |
| 9 | 4-amino-5,8-dimethylchroman. | 2-(5,8-dimethyl-4-chromanylamino)-2-oxazoline. |
| 10 | 4-amino-8-methoxy-5-methylchroman. | 2-(8-methoxy-5-methyl-4-chromanylamino-2-oxazoline. |
| 11 | 4-amino-8-chlorothiochroman. | 2-(8-chloro-4-thiochromanylamino)-2-oxazoline. |
| 12 | 4-amino-8-butylisothiochroman. | 2-(8-butyl-4-isothiochromanylamino)-2-oxazoline. |
| 13 | 4-amino-8-ethylthiochroman. | 2-(8-ethyl-4-thiochromanylamino)-2-oxazoline. |
| 14 | 4-amino-8-propylchroman. | 2-(8-propyl-4-chromanylamino)-2-oxazoline. |
| 15 | 4-amino-2,3-dimethylchroman. | 2-(2,3-dimethyl-4-chromanylamino)-2-oxazoline. |
| 16 | 4-amino-2,3,8-trimethylchroman. | 2-(2,3,8-trimethyl-4-chromanylamino)-2-oxazoline. |
| 17 | 4-amino-6-dimethylaminothiochroman. | 2-(6-dimethylamino-4-thiochromanylamino)-2-oxazoline. |
| 18 | 4-amino-6-chlorothiochroman. | 2-(6-chloro-4-thiochromanylamino)-2-oxazoline. |
| 19 | 4-amino-6-fluoroisothiochroman. | 2-(6-fluoro-4-isothiochromanylamino)-2-oxazoline. |
| 20 | 4-amino-6-bromothiochroman. | 2-(6-bromo-4-thiochromanylamino)-2-oxazoline. |
| 21 | 4-amino-6-butoxychroman. | 2-(6-butoxy-4-chromanylamino)-2-oxazoline. |
| 22 | 4-amino-2-methyl-6-propoxychroman | 2-(2-methyl-6-propoxy-4-chromanylamino)-2-oxazoline. |
| 23 | 4-amino-2-ethylthiochroman. | 2-(2-ethyl-4-thiochromanylamino)-2-oxaxoline. |
| 24 | 4-amino-2-propylchroman. | 2-(2-propyl-4-chromanylamino)-2-oxazoline. |
| 25 | 4-amino-8-methyl-7-methylthiothiochroman. | 2-(8-methyl-7-methylthio-4-thiochromanylamino)-2-oxazoline. |
| 26 | 4-amino-6-methylthiothiochroman. | 2-(6-methylthio-4-thiochromanylamino)-2-oxazoline. |
| 27 | 4-amino-6-propylthiothiochroman. | 2-(6-propylthio-4-thiochromanylamino)-2-oxazoline. |
| 28 | 4-amino-8-dimethylaminothiochroman. | 2-(8-dimethylamino-4-thiochromanylamino)-2-oxazoline. |
| 29 | 4-amino-6-dimethylamino-1,2,3,4-tetrahydro-1-methylquinoline. | 2-(6-dimethylamino-1,2,3,4-tetrahydro-1-methyl-4-quinolinylamino)-2-oxazoline. |
| 30 | 4-amino-6-chloro-8-methylthiochroman. | 2-(6-chloro-8-methyl-4-thiochromanylamino)-2-oxazoline. |
| 31 | 4-amino-7-chloro-8-methylchroman. | 2-(7-chloro-8-methyl-4-chromanylamino)-2-oxazoline. |
| 32 | 4-amino-6-chloro-2-ethylchroman. | 2-(6-chloro-2-ethyl-4-chromanylamino)-2-oxazoline. |
| 33 | 4-amino-8-chloro-5-methylthiochroman. | 2-(8-chloro-5-methyl-4-thiochromanylamino)-2-oxazoline. |
| 34 | 4-amino-8-ethylisochroman. | 2-(8-ethyl-4-isochromanylamino)-2-oxazoline. |
| 35 | 4-amino-8-ethylisothiochroman. | 2-(8-ethyl-4-isothiochromanylamino)-2-oxazoline. |
| 36 | 4-amino-8-ethyl-6-fluoroisothiochroman. | 2-(8-ethyl-6-fluoro-4-isothiochromanylamino)-2-oxazoline. |
| 37 | 4-amino-7,8-dimethylisothiochroman. | 2-(7,8-dimethyl-4-isothiochromanylamino)-2-oxazoline. |
| 38 | 4-amino-6,8-diethylisothiochroman. | 2-(6,8-diethyl-4-isothiochromanylamino)-2-oxazoline. |
| 39 | 4-amino-1,2,3,4-tetrahydro-2-methylisoquinoline. | 2-(1,2,3,4-tetrahydro-2-methyl-4-isoquinolinylamino)-2-oxazoline. |
| 40 | 4-amino-1,2,3,4-tetrahydro-2,8-dimethylisoquinoline. | 2-(1,2,3,4-tetrahydro-2,8-dimethyl-4-isoquinolinylamino)-2-oxazoline. |
| 41 | 4-amino-8-fluorothiochroman. | 2-(8-fluoro-4-thiochromanylamino)-2-oxazoline. |
| 42 | 4-amino-6-chloroisothiochroman. | 2-(6-chloro-4-isothiochromanylamino)-2-oxazoline. |
| 43 | 4-amino-6-bromoisothiochroman. | 2-(6-bromo-4-thiochromanyl)-2-oxazoline. |
| 44 | 4-amino-6-dimethylaminoisothiochroman. | 2-(6-dimethylamino-4-isothiochromanylamino)-2-oxazoline. |
| 45 | 4-amino-8-methoxyisothiochroman. | 2-(8-methoxy-4-isothiochromanylamino)-2-oxazoline. |
| 46 | 4-amino-8-methylthioisothiochroman. | 2-(8-methylthio-4-isochromanylamino)-2-oxazoline. |
| 47 | 4-amino-8-butylthiothiochroman. | 2-(8-butylthio-4-thiochromanylamino)-2-oxazoline. |
| 48 | 4-amino-1,3,8-trimethylisothiochroman. | 2-(1,3,8-trimethyl-4-isothiochromanylamino)-2-oxazoline. |
| 49 | 4-amino-1,3,6,8-tetramethylisothiochroman. | 2-(1,3,6,8-tetramethyl-4-isothiochromanylamino)-2-oxazoline. |
| 50 | 4-amino-2,3,6,8-tetramethylthiochroman. | 2-(2,3,6,8-tetramethyl-4-thiochromanylamino)-2-oxazoline. |

EXAMPLE 51

A large number of unit capsules are prepared for oral administration by mixing the following ingredients:

Parts by wt.
2-(4-thiochromanylamino)-2-oxazoline _____ 2,000
Lactose U.S.P. _____ 7,950
Dry pyrogenic silica $SiO_2$ with particle size of 0.015 micron, surface area of 200 m.$^2$/gm., and bulk density of 2.2 lbs./cu. ft. ("Cabosil," Cabot Corp.) _____ 50

After mixing, the mixture is screened through a 40 mesh screen and encapsulated in No. 3 two-piece hard gelatin capsules.

EXAMPLE 52

2-(4-thiochromanylamino)-2-oxazoline (20 parts by weight) is dispersed in 100 parts by volume of corn oil and encapsulated to form standard soft gelatin capsules.

EXAMPLE 53

Tablets for oral administration are prepared by mixing 50 milligrams of 2-(4-thiochromanylamino)-2-oxazoline, 2.5 milligrams of gelatin, 2.5 milligrams of magnesium stearate and 100 milligrams of starch, and forming the mixture into tablets by a conventional tableting machine. Slow release pills and tablets can also be used.

EXAMPLE 54

A composition suitable for aerosolization is prepared by dissolving 5% by weight of 2-(4-thiochromanylamino)-2-oxazoline in 95% by volume of acetone.

Rhesus monkeys are confined in a dynamic exposure chamber into which the above composition is aerosolized so that a Ct 500 value (C=concentration in micrograms per liter; t=time in minutes) of the 2-(4-thiochromanylamino)-2-oxazoline is maintained for five minutes. The animals show central nervous system depression and become ataxic and docile. Recovery is uneventful.

EXAMPLE 55

Mongolian gerbils are placed in a 16-liter semi-dynamic exposure chamber into which 2-(1,2,3,4-tetrahydro-1-methyl-4-quinolinylamino)-2 - oxazoline, formulated in the same manner as the active ingredient of Example 54, is aerosolized so that the animals are exposed to 3000 Ct for one minute. The gerbils exhibit marked decreased locomotor activity for about one hour after treatment.

EXAMPLE 56

Mice are placed in a 2.85-liter bell-jar chamber into which an acetone solution of 2-(8-methoxy-4-thiochromanylamino)-2-oxazoline is aerosolized so that the animals are exposed to a nominal 8000 Ct of the compound for two minutes. Pronounced central nervous system depression occurs as shown by a decrease in spontaneous locomotor activity by the mice as measured in a Woodard activity cage counter 20 minutes after exposure. Recovery is normal and no toxicity occurs at Ct values 10 times greater than that used.

EXAMPLE 57

Beagle dogs are injected via the cephalic vein with a sterilized suspension containing 1% by weight 2-(4-chromanylamino)-2-oxazoline and 99% by volume of a vehicle consisting of 10% acetone and 90% of 0.5% methylcellulose in water. The dosage of active ingredient is 0.032 milligram per kilogram of body weight. Central nervous system depression results as shown by sedation, ataxia and depression. Recovery of normal function occurs in about two hours.

EXAMPLE 58

Cats are given intravenous administration of the 2-(8-methyl-4-thiochromanylamino)-2-oxazoline, 0.05 milligram per kilogram, formulated in a sterilized solution containing 1% by weight of the active ingredient and 99% by volume of a vehicle consisting of 10% acetone and 90% of 0.5% methyl cellulose in water. Central nervous system depression results promptly as shown by decreased locomotor activity, ataxia, and difficulty in maintenance of righting reflex. Recovery without injurious after effects occurs in a few hours.

EXAMPLE 59

A male rhesus monkey is given via the femoral vein an injection of a sterilized solution containing 5% by weight 2-(4-isothiochromanylamino)-2-oxazoline hydrochloride and 95% by volume of physiological saline. The active ingredient is given at a dosage of 0.1 milligram per kilogram of body weight. Central nervous system depression occurs as evidenced by loss of aggressive behavior and the animal becomes briefly prostrated. Toxicity occurs at such doses that a therapeutic ratio of 10 or more is obtained.

EXAMPLE 60

Rats are treated intramuscularly with a sterilized suspension containing 5% by weight 2-(3-methyl-4-thiochromanylamino)-2-oxazoline and 95% by volume of physiological saline. The active ingredient is given at a dosage of 0.2 milligram per kilogram of body weight. In 10 minutes central nervous system depression results, as exemplified by ataxia and decrease in spontaneous motor activity. Toxicity occurs at such doses that a therapeutic ratio of 150 or more is obtained.

EXAMPLE 61

A sterilized suspension containing 5% by weight 2-(3-methyl-4-thiochromanylamino)-2-oxazoline and 95% by volume of physiological saline is intraperitoneally administered to mice. The active ingredient is given at a dosage of 1 milligram per kilogram of body weight. It produces central nervous depression exemplified by decreased locomotor activity and decreased rearing and sniffing. Toxicity occurs at such doses that a therapeutic ratio of 30 or more is obtained.

EXAMPLE 62

A sterilized suspension containing 5% by weight of 2-(8-ethyl-4-thiochromanylamino)-2-oxazoline and 95% by volume of physiological saline. The active ingredient is administered subcutaneously to rats at a dosage of four milligrams per kilogram of body weight. Central nervous system depression characterized by abnormal gait and decreased spontaneous activity results. Toxicity occurs at such doses that a therapeutic ratio of 20 or more is obtained.

EXAMPLE 63

A sterilized suspension containing 5% by weight of 2-(8-methoxy-4-chromanylamino)-2-oxazoline and 95% by volume of peanut oil is administered to dogs. The active ingredient is given orally at a dosage of one milligram per kilogram of body weight. Marked sedation for several hours followed by normal recovery is observed.

Compounds of my invention can be combined with anticholinergics as set forth in an application assigned to my assignee, Ser. No. 348,291 filed Feb. 28, 1964. The mixtures obtained also exhibit central nervous system depressant activity. The oxazolines of this invention can be combined with the anticholinergics of the aforementioned application at like rates and can be applied to animals in like manner. The disclosure of Ser. No. 348,291 is herein incorporated by reference.

Whereas the above examples describe effects on lower order warm-blooded animals, the invention is not limited to use in just these animals. It is believed that the compounds herein described are also useful as central nervous system depressants in higher order animals including humans.

What is claimed is:
1. A compound of the formula:

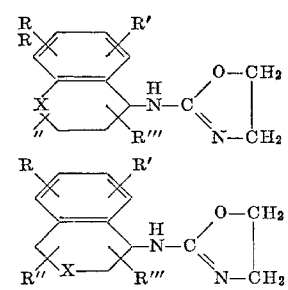

wherein
X is selected from the group consisting of oxygen and sulfur;
R is selected from the group consisting of hydrogen and methyl;
R' is selected from the group consisting of hydrogen, alkyl of 1 through 4 carbon atoms, and alkoxy of 1 through 4 carbon atoms;
R'' is selected from the group consisting of hydrogen and methyl; and
R''' is selected from the group consisting of hydrogen and methyl.

2. A compound of the formula:

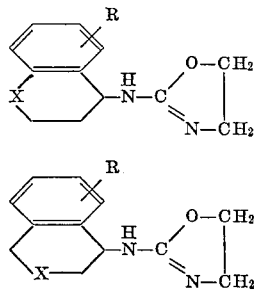

wherein
X is selected from the group consisting of oxygen and sulfur;
R is selected from the group consisting of hydrogen, alkyl of 1 through 4 carbon atoms and alkoxy of 1 through 4 carbon atoms.

3. A compound according to claim 2 which is 2-(4-thiochromanylamino)-2-oxazoline.
4. A compound according to claim 2 which is 2-(4-isothiochromanylamino)-2-oxazoline.
5. A compound according to claim 2 which is 2-(8-methyl-4-thiochromanylamino)-2-oxazoline.
6. A compound according to claim 2 which is 2-(8-methyl-4-chromanylamino)-2-oxazoline.
7. A compound according to claim 2 which is 2-(8-methoxy-4-chromanylamino)-2-oxazoline.
8. A compound according to claim 2 which is 2-(4-chromanylamino)-2-oxazoline.
9. A compound according to claim 2 which is 2-(4-isochromanylamino)-2-oxazoline.

References Cited
UNITED STATES PATENTS

| | | | |
|---|---|---|---|
| 2,493,748 | 1/1950 | Brooker et al. | 260—288 X |
| 2,870,159 | 1/1959 | Bloom | 260—307 |
| 2,870,160 | 1/1959 | Bloom | 260—307 |
| 2,870,161 | 1/1959 | Bloom | 260—307 |
| 2,876,223 | 3/1959 | Bloom | 260—288 X |
| 2,889,351 | 6/1959 | Bloom | 260—307 |
| 2,992,232 | 11/1961 | Bloom | 260—307 X |
| 3,278,382 | 10/1966 | Poos | 260—307 |
| 3,340,266 | 9/1967 | Howe | 260—288 |

DONALD G. DAUS, Primary Examiner

U.S. Cl. X.R.

424—272, 258; 260—286, 288, 345.5, 327, 453, 553